United States Patent [19]  [11] 4,344,672
Bleiweiss et al.  [45] Aug. 17, 1982

[54] TRUCK MIRROR WITH OVERLYING BOTTOM END COVER

[75] Inventors: Arthur F. Bleiweiss; Dimitru Cotoara, both of Toronto; Robert J. Wilkes, Caledon, all of Canada

[73] Assignee: Dominion Auto Accessories Limited, Toronto, Canada

[21] Appl. No.: 221,062

[22] Filed: Dec. 29, 1980

[51] Int. Cl.³ .............................................. G02B 7/18
[52] U.S. Cl. .................................. 350/288; 248/475 R
[58] Field of Search ............... 350/288, 303, 304, 307, 350/67; 248/466, 473, 475 R

[56] References Cited

U.S. PATENT DOCUMENTS 3,175,463  3/1965  Seashore ............................. 350/303
3,713,726  1/1973  Magi .................................... 350/307
4,303,308 12/1981  Kobrin .................................. 350/303

FOREIGN PATENT DOCUMENTS 2740189  3/1979  Fed. Rep. of Germany ...... 248/466
2726311  4/1979  Fed. Rep. of Germany ...... 350/288
1069393  1/1967  United Kingdom ............... 350/288
1125846  9/1968  United Kingdom ............... 350/288
1572746  1/1980  United Kingdom ............... 350/288

Primary Examiner—Jon W. Henry
Attorney, Agent, or Firm—Barnes, Kisselle, Raisch & Choate

[57] ABSTRACT

A truck mirror comprising a unitary housing having a back wall, side walls and top and bottom walls defining a generally rectangular opening. The side walls have inwardly extending spaced flanges. The bottom wall terminates short of the side walls so that a flat mirror can be inserted by sliding longitudinally upwardly through the spaced flanges toward the top wall. A top end cover member is interposed between the top edge of the mirror and the top wall and has end portions extending laterally behind the outermost flanges along the side walls. A bottom end cover is interposed between the bottom edge of the mirror and the bottom wall of said housing and has portions thereof extending upwardly along the outer face of the lower edge of the mirror. The bottom end cover also has portions thereof extending inwardly in overlying relation to the bottom wall of the housing.

5 Claims, 10 Drawing Figures

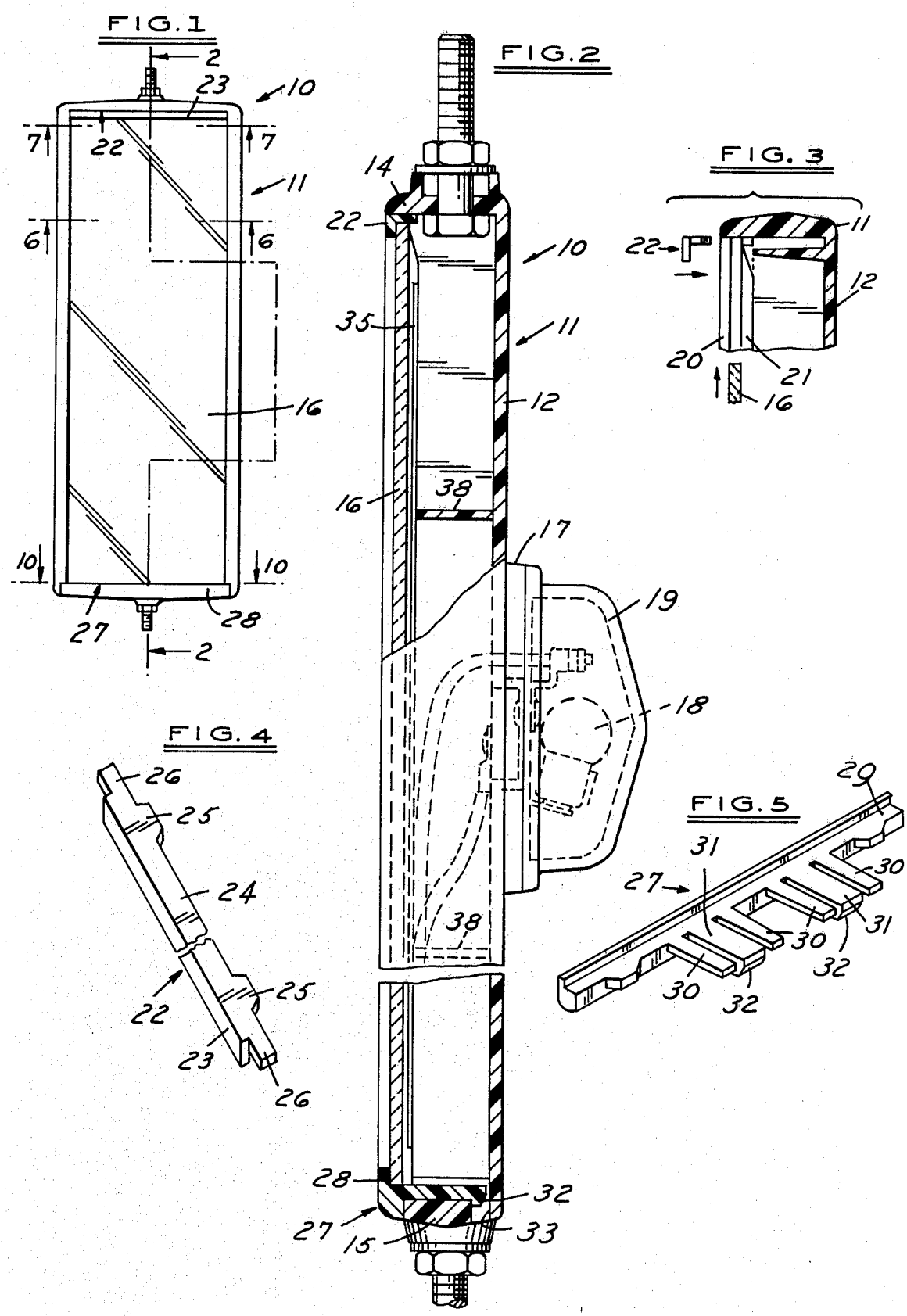

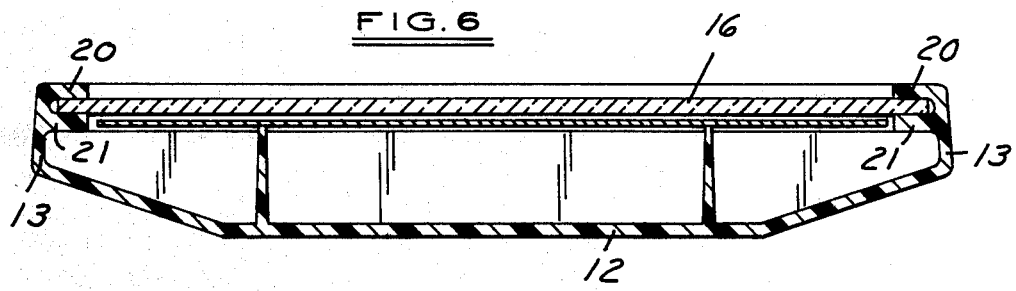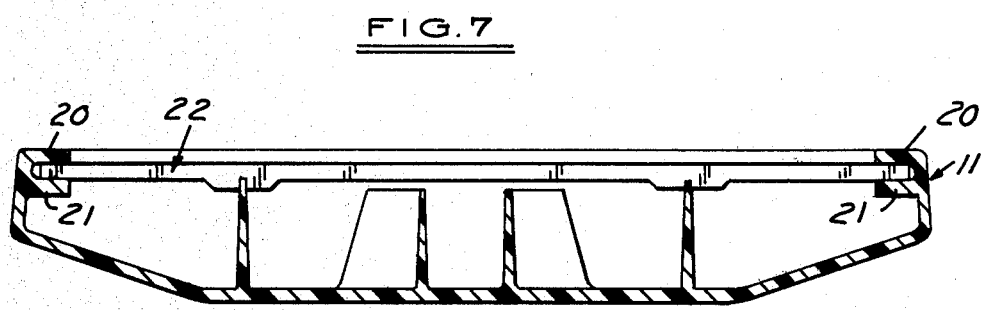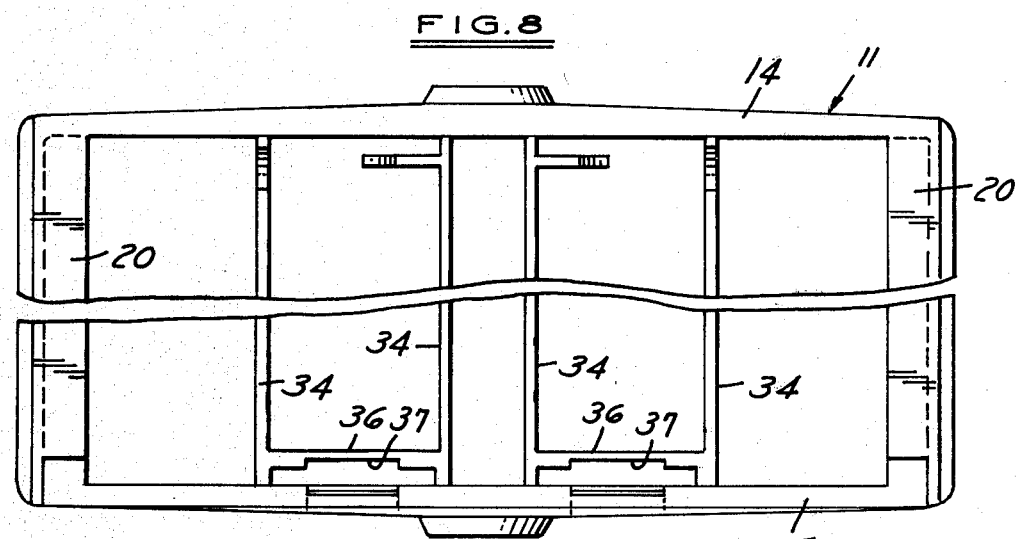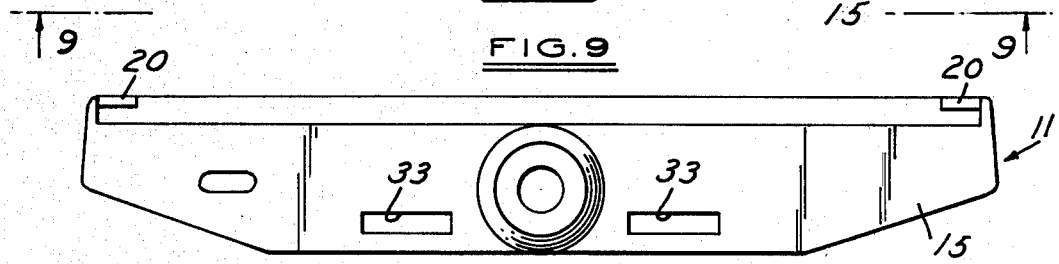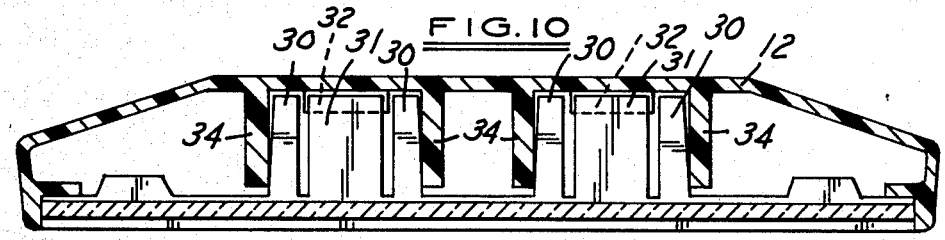

TRUCK MIRROR WITH OVERLYING BOTTOM END COVER

This invention relates to truck mirrors.

BACKGROUND AND SUMMARY OF THE INVENTION

In the manufacture of truck mirrors, a major consideration in cost is the numerous parts that must be provided and the complex assembly associated therewith.

Among the objectives of the present invention are to provide a truck mirror which utilizes a number of preformed parts, is easy to assemble and, as a result, is low in cost, and is easy to disassemble to permit insertion of a new replacement mirror.

DESCRIPTION OF THE DRAWINGS

FIG. 1 is a front elevational view of a mirror embodying the invention;

FIG. 2 is a fragmentary sectional view on an enlarged scale taken along the line 2—2 in FIG. 1;

FIG. 3 is a fragmentary, partially exploded view of the upper end of the mirror in FIG. 2;

FIG. 4 is a fragmentary perspective view of the top end cover of the mirror;

FIG. 5 is a perspective view of the bottom end cover of the mirror;

FIG. 6 is a sectional view on an enlarged scale taken along the line 6—6 in FIG. 1;

FIG. 7 is a sectional view on an enlarged scale taken along the line 7—7 in FIG. 1 with parts removed;

FIG. 8 is a front elevational view on an enlarged scale of the housing portion of the mirror;

FIG. 9 is a view taken along the line 9—9 of FIG. 8;

FIG. 10 is a sectional view on an enlarged scale taken along the line 10—10 of FIG. 1.

DESCRIPTION

Referring to FIGS. 1, 2 and 6 the truck mirror 10 embodying the invention comprises a housing 11 that includes a rear wall 12, side walls 13, a top wall 14 and a bottom wall 15, thereby defining a generally rectangular opening which receives a mirror 16, as presently described. The rear wall 12 may also receive a light housing 17 that contains a bulb 18 and includes a transparent cover or lens 19 for providing a forwardly extending signal as is well known in the art.

As shown in FIGS. 6 and 7, the side walls 13 include outer and inner flanges 20, 21 between which the mirror 16 extends. As shown in FIG. 2, the bottom wall 15 terminates short of the slot formed by the outer and inner flanges 20, 21 so that the mirror can be moved by sliding movement upwardly into position.

A top end cover 22 (FIG. 4) is provided between the top wall 14 and the upper edge of the mirror 16 and comprises a vertical portion 23 and a horizontal portion 24 with spaced spacer portions 25 extending inwardly of the housing for engaging portions of the housing. The top end cover 22 further includes laterally extending portions 26 that extend between the outer and inner flanges 20, 21 as shown in FIG. 7.

The mirror further includes a bottom end cover 27 (FIG. 5) that includes a portion 28 that extends upwardly along the outer surface of the mirror 16 and horizontal portion 29 including fingers 30, 31 that extend rearwardly toward the rear wall 12. The fingers 30, 31 engage the top surface of the bottom wall and the fingers 31 include enlarged portions 32 that snap into openings 33 in the bottom wall 15 adjacent the rear wall 12. Fingers 30 function as spacers on each side of the fingers 31 and walls 34 extend from the rear wall 12 as shown in FIG. 10.

If desired, a heater element 35 can be provided along the front edge of the walls 34, 38.

As further shown in FIG. 8, integral transverse walls 36 extend between each pair of walls 34 and have cut away portions 37 which will permit the fingers 31 to spring upwardly and thereafter spring back to bring the enlarged portions 32 into the openings 33.

It can thus be seen that there is provided a truck mirror which is relatively simple to produce, the housing and the bottom and top end covers being plastic and injection molded, easily assembled and thereby resulting in a lower cost mirror. The housing 11, top end cover 22 and bottom end cover 27 are preferably made of a plastic material such as polypropylene copolymer, 20% talc filled, and ultraviolet stabilized.

It is apparent that if the heater element 35 and light housing 17 are utilized, the various wall portions would include slots and the like to accommodate the wire.

In order to mount the housing, bolts are provided through the top and bottom walls for pivotal mounting of the truck mirror in accordance with well known construction.

Referring to FIG. 2, in order to disassemble the mirror to replace mirror 16, a screwdriver or other equivalent means can be inserted through an opening 33 to lift an enlarged portion 32 of a finger 31 and, in turn, the bottom end cover 27. The procedure is repeated for each enlarged portion 32 until the bottom end cover 27 is completely released permitting removal and replacement of the mirror 16.

We claim:

1. A truck mirror comprising a unitary housing having a back wall, side walls and top and bottom walls defining a generally, rectangular opening, said side walls having inwardly extending spaced flanges, said bottom wall terminating short of the side walls so that a mirror can be inserted by sliding longitudinally upwardly through the spaced flanges toward the top wall, a top end cover member interposed between said top edge of said mirror and said top wall, said member having end portions extending laterally behind said outermost flange along said side walls, a bottom end cover interposed between the bottom edge of said mirror and said bottom wall of said housing, said bottom end cover having portions thereof extending upwardly along the outer face of the lower edge of the mirror, said bottom end cover having portions thereof extending inwardly in overlying relation to said bottom wall of said housing.

2. The truck mirror set forth in claim 1 wherein said top end cover member has spacer portions extending inwardly, said housing having wall portions extending outwardly of said rear wall and engaging said spacer portions.

3. A truck mirror set forth in claim 1 wherein said bottom end cover has a plurality of fingers extending inwardly of said housing, at least some of said fingers having portions thereof engaging openings in said bottom wall of said housing.

4. The truck mirror set forth in claim 3 wherein each said finger having opening engaging portions is interposed between a pair of spacer fingers.

5. A truck mirror comprising a unitary plastic housing having a back wall, side walls and top and bottom walls defining a generally rectangular opening, said side walls having inwardly extending spaced flanges, said bottom wall terminating short of the side walls so that a mirror can be inserted by sliding longitudinally upwardly through the spaced flanges toward the top wall, a plastic top end cover member interposed between said top edge of said mirror and said top wall, said member having end portions extending laterally behind said outermost flange along said side walls, a plastic bottom end cover interposed between the bottom edge of said mirror and said bottom wall of said housing, said bottom end cover having portions thereof extending upwardly along the outer face of the lower edge of the mirror, said bottom end cover having portions thereof extending inwardly in overlying relation to said bottom wall of said housing, said top end cover member having spacer portions extending inwardly, said housing having integral wall portions extending outwardly of said rear wall and engaging said spacer portions, said bottom end cover having a plurality of integral fingers extending inwardly of said housing, at least some of said fingers having portions thereof engaging openings in said bottom wall of said housing, each said finger having opening engaging portions is interposed between a pair of spacer fingers.

* * * * *